(12) United States Patent
Lund et al.

(10) Patent No.: US 8,159,843 B2
(45) Date of Patent: Apr. 17, 2012

(54) METHOD AND APPARATUS TO REGULATE AN OUTPUT VOLTAGE OF A POWER CONVERTER AT LIGHT/NO LOAD CONDITIONS

(75) Inventors: Leif Lund, San Jose, CA (US); Alex B. Djenguerian, Saratoga, CA (US); William M. Polivka, Campbell, CA (US)

(73) Assignee: Power Integrations, Inc., San Jose, CA (US)

( * ) Notice: Subject to any disclaimer, the term of this patent is extended or adjusted under 35 U.S.C. 154(b) by 478 days.

(21) Appl. No.: 12/363,657

(22) Filed: Jan. 30, 2009

(65) Prior Publication Data

US 2010/0194367 A1    Aug. 5, 2010

(51) Int. Cl.
*H02H 7/122* (2006.01)
(52) U.S. Cl. .......... 363/56.01; 363/20; 323/284
(58) Field of Classification Search ........ 363/16–20, 363/21.02, 21.08, 21.16, 56.01, 56.02, 37, 363/58, 96, 97, 131; 323/222, 224, 282–285, 323/312–315; 361/18
See application file for complete search history.

(56) References Cited

U.S. PATENT DOCUMENTS

| 3,541,420 | A | * | 11/1970 | Rees | 363/21.09 |
| 4,933,830 | A | * | 6/1990 | Sato et al. | 363/131 |
| 5,101,335 | A | | 3/1992 | Ludden et al. | |
| 5,313,381 | A | * | 5/1994 | Balakrishnan | 363/147 |
| 6,141,232 | A | | 10/2000 | Weinmeier et al. | |
| 6,249,876 | B1 | * | 6/2001 | Balakrishnan et al. | 713/501 |
| 6,256,179 | B1 | * | 7/2001 | Yamada et al. | 361/18 |
| 6,356,466 | B1 | * | 3/2002 | Smidt et al. | 363/21.17 |
| 6,519,165 | B2 | * | 2/2003 | Koike | 363/21.12 |
| 6,525,514 | B1 | * | 2/2003 | Balakrishnan et al. | 323/277 |
| 6,912,136 | B2 | * | 6/2005 | Thrap | 363/21.01 |
| 7,755,917 | B2 | * | 7/2010 | Djenguerian et al. | 363/95 |
| 7,876,583 | B2 | * | 1/2011 | Polivka et al. | 363/21.14 |
| 2008/0298095 | A1 | * | 12/2008 | Chuang et al. | 363/21.12 |

FOREIGN PATENT DOCUMENTS

EP   1 213 823 A2   6/2002

OTHER PUBLICATIONS

EP 10 15 1572—European Search Report, dated May 10, 2010, 2 pages.
EP 10 151 572.4 European Office Action, dated Jun. 7, 2010, 7 pages.

* cited by examiner

*Primary Examiner* — Rajnikant Patel
(74) *Attorney, Agent, or Firm* — Blakely Sokoloff Taylor & Zafman LLP

(57) ABSTRACT

An example apparatus to regulate an output voltage of a power converter at light/no load conditions includes a driver circuit, a feedback circuit, and an adjustable voltage reference circuit. The driver circuit is coupled to output a drive signal to switch a power switch between an ON state and an OFF state to regulate an output of the power converter. The feedback circuit is coupled to the driver circuit and is further coupled to output an enable signal to switch the power switch to an ON state in response to an output voltage signal. The adjustable voltage reference circuit is coupled to adjust a voltage reference such that a bias winding voltage of the power converter is adjusted nonlinearly in response to a load that is to be coupled to the output of the power converter.

36 Claims, 11 Drawing Sheets

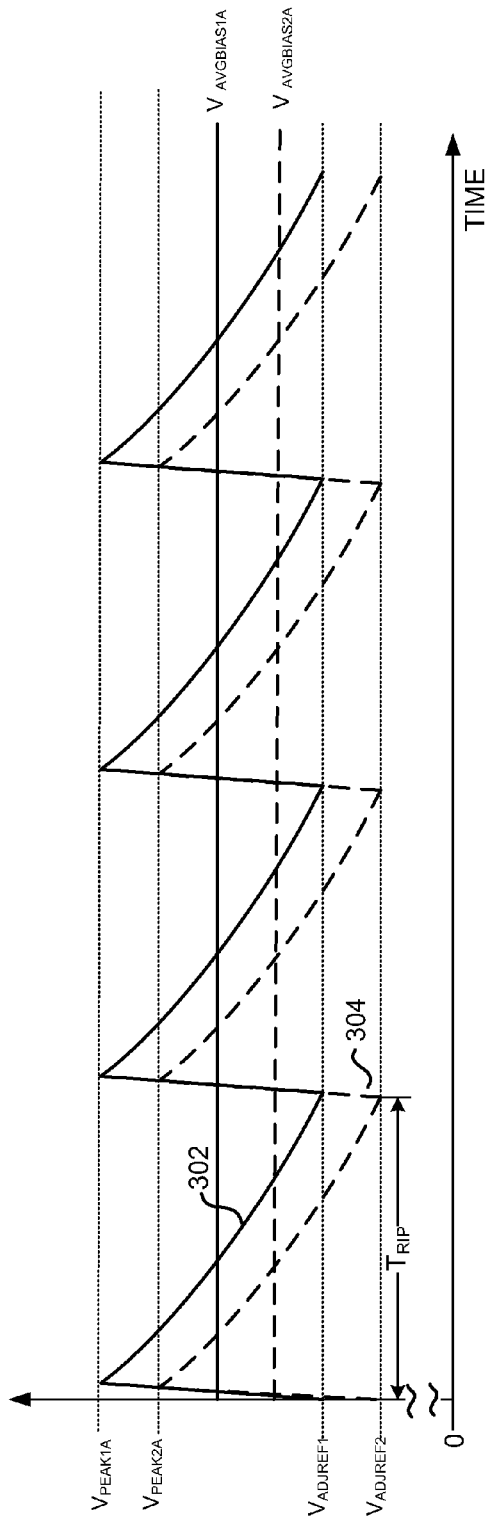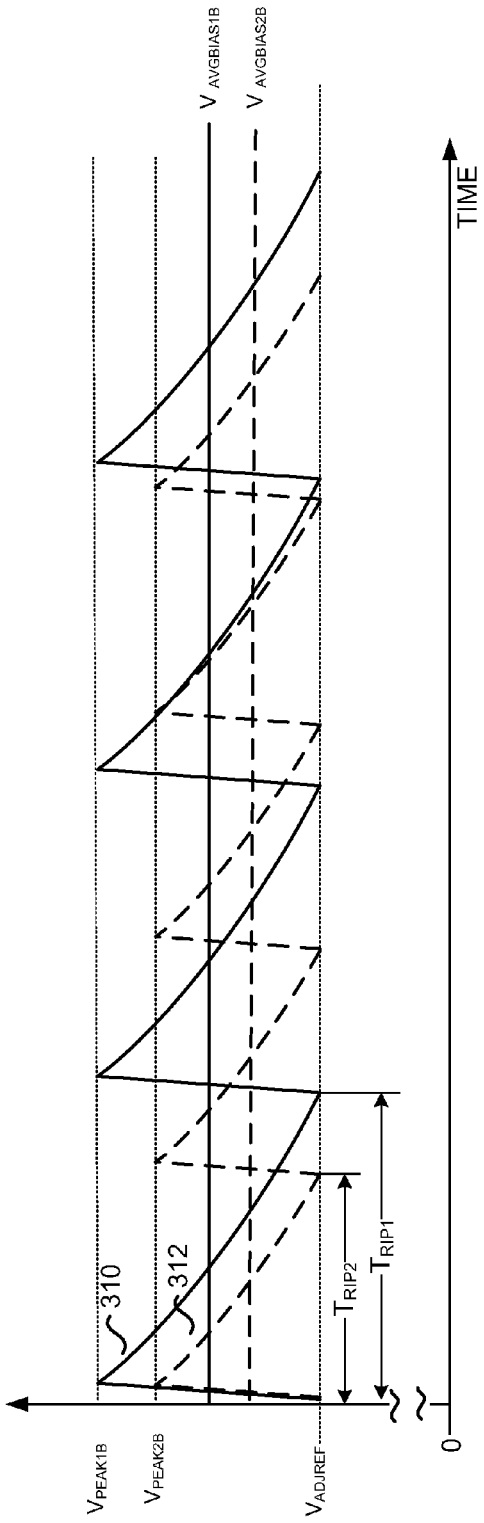
FIG. 3A
FIG. 3B

METHOD AND APPARATUS TO REGULATE AN OUTPUT VOLTAGE OF A POWER CONVERTER AT LIGHT/NO LOAD CONDITIONS

BACKGROUND INFORMATION

1. Field of the Disclosure

The present invention relates generally to power converters, and more specifically, the invention relates to improving output voltage regulation at light/no load conditions.

2. Background

Many electrical devices such as cell phones, personal digital assistants (PDA's), laptops, etc. are powered by a source of dc power. Because power is generally delivered through a wall outlet as high-voltage ac power, a device, such as a power converter, is required to transform the high-voltage ac power to usable dc power for many electrical devices. In operation, a power converter may use a controller to regulate energy delivered to an electrical device that may be generally referred to as a load. In one instance a controller may control the transfer of energy pulses by switching a power switch on and off in response to feedback information of an output voltage to keep the output voltage at the output of the power converter regulated.

In certain applications, power converters may include an energy transfer element to separate an input side from an output side of the power converter. More specifically, the energy transfer element may provide galvanic isolation which prevents dc current from flowing between the input and the output of the power converter and may be required due to certain safety regulations. A common example of an energy transfer element is a coupled inductor, where electrical energy received by an input winding on the input side is stored as magnetic energy and then converted back to electrical energy at the output side of the power converter across an output winding.

For certain power converter designs it may be required to regulate the output voltage within a specified voltage range. To accomplish this, some power converters may use 'primary feedback' to allow indirect sensing of the output voltage from the input side of the power converter in order to regulate an output voltage within a specified range. Primary feedback may be used instead of circuitry that directly senses an output voltage at the output of the power converter in order to reduce costs. One example of primary feedback is to electrically couple a bias winding to the input side of the power converter such that it is also magnetically coupled (not directly connected) to the output winding of the energy transfer element. This allows the bias winding to produce a voltage representative of the output voltage of the power converter across the bias winding, which shares an electrical connection with the input side of the power converter. In this manner, the power converter acquires a feedback signal representative of the output voltage without directly sensing the output voltage at the output of the power converter.

However, when implementing a primary feedback for regulation in a power converter at substantially light/no load conditions (where the load demands very little or no power), the output voltage may deviate substantially from its desired value. This may prevent the output voltage from being within the specified output voltage range at light/no load conditions.

BRIEF DESCRIPTION OF THE DRAWINGS

Non-limiting and non-exhaustive embodiments and examples of the present invention are described with reference to the following figures, wherein like reference numerals refer to like parts throughout the various views unless otherwise specified.

FIGS. 3A and 3B illustrate example waveforms of an adjusted bias voltage, in accordance with the teachings of the present invention.

DETAILED DESCRIPTION

A method and apparatus to improve regulation of an output voltage of a power converter over a range of load conditions is disclosed. More specifically, a method and apparatus for adjusting a bias voltage nonlinearly in response to varying load conditions of the power converter is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

Figure 1A:
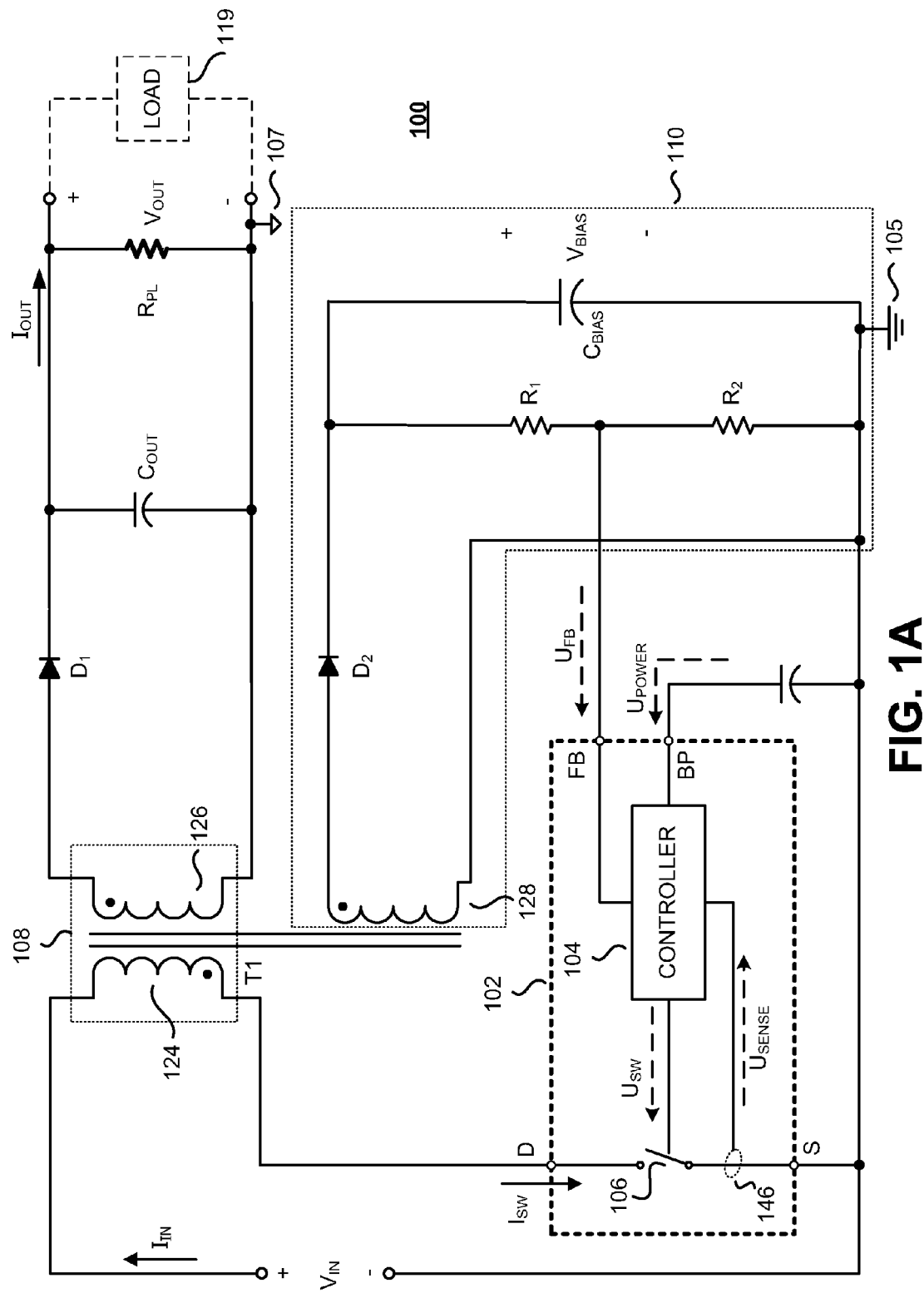
FIG. 1A is a functional block diagram illustrating an example power converter, in accordance with the teachings of the present invention.

Referring now to FIG. 1A, a functional block diagram illustrates a power converter 100, in accordance with the teachings of the present invention. In the illustrated example, power converter 100 includes an integrated circuit 102 further including a controller 104 and a power switch 106, an energy transfer element 108, a feedback circuit 110, a diode $D_1$, an output capacitor $C_{OUT}$, and a pre-load resistor $R_{PL}$. Integrated circuit 102 further includes a drain terminal D, source terminal S, feedback terminal FB, and bypass terminal BP. As shown, feedback circuit 110 is illustrated as including a bias winding 128, a diode $D_2$, a first resistor and second resistor $R_1$ and $R_2$, respectively, and a bias capacitor $C_{BIAS}$.

As shown, power converter 100 is configured as a flyback converter. In operation, power converter 100 provides output power to a load 119 from an unregulated dc input voltage $V_{IN}$, from hereon referred to as "input voltage". In the example of FIG. 1, energy transfer element 108 is a coupled inductor, from hereon referred to as a 'transformer', with an input winding 124 and an output winding 126. An "input winding" may also be referred to as a "primary winding" and an "output winding" may also be referred to as a "secondary winding." In one example, energy transfer element 108 may provide galvanic isolation. More specifically, galvanic isolation prevents dc current from flowing between the input side and the output side of power converter 100, and is usually required to meet safety regulations. As shown, an input return 105 is electrically coupled to circuitry as being referenced on the 'input side' of power converter 100. Similarly, an output return 107 is electrically coupled to circuitry on the 'output' side of power converter 100.

In one example, primary winding 124 is coupled to power switch 106 such that, in operation, energy transfer element 108 receives energy with an input current $I_{IN}$ when power switch 106 is in an on state and energy transfer element 108 delivers energy to the output of power converter 100 when power switch 106 is in an off state.

As shown, power switch 106 may be switched between an 'on' state, thereby allowing current to be conducted through the switch, and an 'off' state, thereby preventing current to be conducted through the switch. In operation, controller 104 outputs a switching signal $U_{SW}$ to switch power switch 106 between an on state and off state. In one example, controller 104 may operate switch 106 to regulate the output voltage $V_{OUT}$ to its desired value. In one example, controller 104 includes an oscillator (not shown) that defines substantially regular switching periods $T_S$ during which switch 106 may be conducting or not conducting. More specifically, regulation of output voltage $V_{OUT}$ is accomplished by switching power switch 106 in response to a feedback signal $U_{FB}$, which is indirectly representative of output voltage $V_{OUT}$, to control the amount of energy transferred from the input to the output of power converter 100. In one example, the feedback signal $U_{FB}$ may directly regulate bias voltage $V_{BIAS}$ to a desired voltage which is representative of a desired value for output voltage $V_{OUT}$. For example, bias voltage $V_{BIAS}$ may be regulated at 20 V in order to indirectly regulate an output voltage $V_{OUT}$ at 5 V.

In one example, power switch 106 is a metal oxide semiconductor field effect transistor (MOSFET). In one example, integrated circuit 102 may be implemented as a monolithic integrated circuit or may be implemented with discrete electrical components or a combination of discrete components and integrated circuits. In one example, integrated circuit 102 is manufactured as a hybrid or monolithic integrated circuit that includes both controller 104 and power switch 106. In another example, power switch 106 is not included in integrated circuit 102 where controller 104 is to be coupled to a power switch that is manufactured as a device separate from controller 104. During operation of power converter 100, the switching of power switch 106 produces pulsating currents in diode $D_1$ which are filtered by output capacitor $C_{OUT}$ to produce a substantially constant output voltage $V_{OUT}$.

As shown, feedback circuit 110 is adapted to provide primary feedback, which allows indirect sensing of the output voltage $V_{OUT}$ from the input side of the power supply. In operation, feedback circuit 110 provides feedback signal $U_{FB}$ to controller 104. In one example, feedback signal $U_{FB}$ may be representative of a bias voltage $V_{BIAS}$. As shown, bias winding 128 is magnetically coupled to output winding 126. Due to the magnetic coupling, during operation, energy transfer element 108 delivers energy to output winding 126 and to bias winding 128 when power switch 106 is in an off state. More specifically, the voltage induced across output winding 126 may be substantially proportional to the voltage across bias winding 128. In this manner, bias voltage $V_{BIAS}$, defined as the voltage across capacitor $C_{BIAS}$, increase to a voltage representative of the output voltage $V_{OUT}$ when diode $D_2$ is conducting during the off state of power switch 106 to charge capacitor $C_{BIAS}$.

As shown, diode $D_2$ is coupled between bias winding 128 and bias capacitor $C_{BIAS}$ to prevent bias capacitor $C_{BIAS}$ from discharging when power switch 106 is conducting. In one example, bias winding voltage $V_{BIAS}$ includes a dc voltage and also includes a component of time-varying voltage also referred to as ripple voltage. In one example, the ripple voltage of $V_{BIAS}$ occurs due to the charging and discharging of capacitor $C_{BIAS}$. More specifically, charging of capacitor $C_{BIAS}$ occurs when energy is transferred to bias winding 128 and diode $D_2$ is conducting. Discharging of capacitor $C_{BIAS}$ occurs when diode $D_2$ is not conducting and energy discharges through resistors R1 and $R_2$ at a substantially constant rate. As shown, a resistor divider including resistor $R_1$ and resistor $R_2$ is coupled across bias capacitor $C_{BIAS}$. In one example, the resistor divider is coupled to provide a divided down bias voltage $V_{BIAS}$ to feedback pin FB of integrated circuit 102.

In operation, power converter 100 implements primary feedback by directly regulating bias voltage $V_{BIAS}$ which is indirectly (through magnetic coupling) representative of the desired value of the output voltage $V_{OUT}$. Therefore, if the output voltage $V_{OUT}$ changes from its desired value, the change in output voltage will proportionately change bias voltage $V_{BIAS}$. Controller 104 will switch power switch 106 accordingly to bring bias voltage $V_{BIAS}$ back to its desired value by adjusting the amount of power delivered to the output. In this manner, output voltage $V_{OUT}$ is regulated indirectly by bias winding voltage $V_{BIAS}$.

In one example, for power switch 106 to regulate the output voltage $V_{OUT}$, controller 104 determines whether or not the power switch 106 will be allowed to conduct during a switching period $T_S$ in response to the feedback signal $U_{FB}$. As stated above, a switching period $T_S$ may be a constant time period set by an oscillator (not shown) in controller 104. A switching period $T_S$ wherein the switch 106 is allowed to conduct is an 'enabled' period. A switching period $T_S$ wherein the switch 106 is not allowed to conduct is a 'disabled' period. In other words, controller 104 decides to either enable or disable power switch 106 during each switching period to control the transfer of energy to the output of power converter 100. In this manner, controller 104 may regulate the output voltage $V_{OUT}$ of power converter 100 in response to feedback signal $U_{FB}$.

Figure 1B:
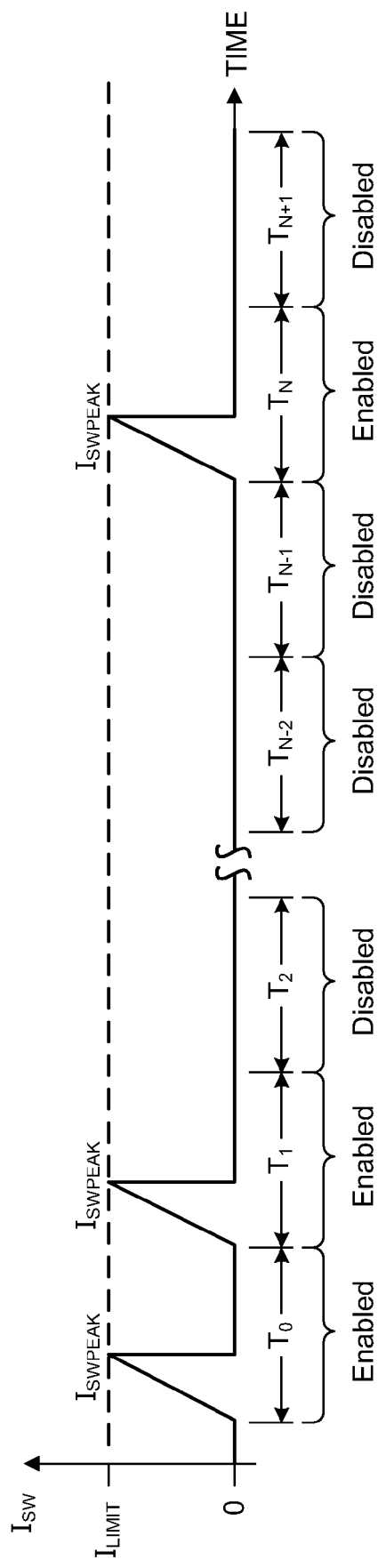
FIG. 1B is an example waveform illustrating a switch current $I_{SW}$ through power switch 106 of FIG. 1A, in accordance with the teachings of the present invention.

Referring now to FIG. 1B, an example waveform of switch current $I_{SW}$ of FIG. 1A for several enabled and disabled switching periods $T_S$ is illustrated, in accordance with the teachings of the present invention. As shown, an example waveform of switch current $I_{SW}$ in the switch 106 is illustrated in FIG. 1B for several enabled and disabled switching periods $T_S$ from $T_0$ through $T_{N+1}$. In the example of FIG. 1B, switch 106 turns on at the beginning of each enabled switching period $T_0$, $T_1$, and $T_N$. Switch 106 conducts until switch current $I_{SW}$ in switch 106 reaches a current limit $I_{LIMIT}$. When switch current $I_{SW}$ reaches current limit $I_{LIMIT}$, switch current is at its peak value, referred to as a peak switch current $I_{SWPEAK}$. By adjusting the current limit $I_{LIMIT}$, the peak of switch current $I_{SW}$ in a switching period $T_S$ is changed, thus changing the amount of energy stored during the on time of power switch 106 during an enabled switching period. The relationship between energy stored and peak current is represented as:

$$E_{TS} = \frac{1}{2} L I_{SWPEAK}^2 \quad \text{EQ. 1}$$

where $E_{TS}$ is the energy stored during a switching period $T_S$, L is the inductance of primary winding 124, and $I_{SWPEAK}$ is the peak current in power switch 106. Continuing with the example as shown, switch 106 does not conduct during disabled switching periods $T_2$, $T_{N-2}$, $T_{N-1}$, and $T_{N+1}$.

Referring back to FIG. 1A, as shown in the depicted example, a current sensor 146 is coupled to sense a switch current $I_{SW}$ flowing through power switch 106. More specifically, current sensor 146, which can in various examples be a current transformer, or a discrete resistor, or a main conduction channel of a transistor when the transistor is conducting, or a senseFET element forming part of a transistor, may be used to measure switch current $I_{SW}$. During operation, current sensor 146 generates a current sense signal $U_{SENSE}$ that is representative of switch current $I_{SW}$. In one example, current sense signal $U_{SENSE}$ is used by controller 104 to determine when switch current $I_{SW}$ reaches a current limit $I_{LIMIT}$ during each enabled switching period $T_S$ as shown in FIG. 1B.

In operation, controller 104 may continuously detect a load condition at the output of power converter 100 and adjust a bias voltage $V_{BIAS}$ in response to the load condition. In one example, a load condition may be detected in response to switching signal $U_{SW}$. For example, when switching signal $U_{SW}$ indicates power switch 106 is enabled for nearly all switching periods $T_S$, this may correspond to a high load condition because power converter 100 is delivering close to a maximum amount of power to the output of power converter 100. Conversely, if switching signal $U_{SW}$ indicates power switch 106 is disabled for nearly all switching periods $T_S$, this may corresponds to light/no load condition because power converter 100 is delivering a small amount of power to power converter 100. A no load condition may be defined as when load 119 coupled to the output of the power converter 100 requires substantially no output current $I_{OUT}$. A high load condition may be defined as when load 119 requires close to a maximum amount of output current $I_{OUT}$. To further clarify, as the load requires more power, output current $I_{OUT}$ delivered to the output of power converter 100 increases. As the load coupled to the output requires less power, the output current $I_{OUT}$ delivered to the output of power converter 100 decreases. In certain instances, such as a no-load/light load conditions, power converter 100 may still need to maintain a desired output voltage at the output of power converter 100. However, during a no load condition, when load 119 requires low amounts of power, energy delivered during a switching period $T_S$ to the output of power converter 100, may substantially increase the output voltage $V_{OUT}$ across capacitor $C_{OUT}$.

In one example, a pre-load resistor $R_{PL}$ may be coupled across output of power converter 100 to provide an additional pathway for output current $I_{OUT}$ at the output of power converter 100 such that the output voltage $V_{OUT}$ does not substantially increase at light/no load conditions (when load 119 receives little or no output current $I_{OUT}$). In other words, pre-load resistor $R_{PL}$ may be designed to always allow for a minimum amount of output current $I_{OUT}$ to be used at the output of power converter 100.

As discussed above, switching of power switch 106 is controlled to regulate the bias voltage $V_{BIAS}$ which is intended to be representative of output voltage $V_{OUT}$. During operation, when the bias voltage $V_{BIAS}$ is above a desired value it is representative of output voltage $V_{OUT}$ being above a desired value. In this scenario, feedback signal $U_{FB}$ will indicate to controller 104 to disable power switch 106 for subsequent switching periods until bias voltage $V_{BIAS}$ drops below its desired value (e.g., by discharging through resistors $R_1$ and $R_2$ when diode $D_2$ is not conducting), thus indicating that output voltage $V_{OUT}$ has dropped below its desired value.

During light/no load conditions, the bias voltage $V_{BIAS}$ may drop to a desired value at a faster rate than the output voltage $V_{OUT}$ may drop to its desired value. The rate at which the bias voltage drops is based on a resistor capacitor (RC) time constant and is related to the values of $R_1$, $R_2$ and $C_{BIAS}$. Therefore, under all load conditions, the time it takes to discharge a certain amount of charge from capacitor $C_{BIAS}$ will be substantially constant. However, the time it takes to discharge a certain amount of charge from capacitor $C_{OUT}$ will be dependent on the load condition at the output of power converter 100. More specifically, power converter 100 varies the amount of power delivered to load 119 based on operational needs. Therefore, load 119 may be seen as a variable resistance that is adjusted to allow for a varying output current $I_{OUT}$ to be delivered to the output of power converter 100. During light/no load conditions, the rate of decrease of the output voltage $V_{OUT}$ may be substantially lower than the rate of decrease of the bias winding voltage $V_{BIAS}$. Therefore, when feedback signal $U_{FB}$ indicates to controller 104 to enable a switching period because bias voltage $V_{BIAS}$ has dropped below its desired value, it may be that the output voltage $V_{OUT}$ is still above its desired value and will receive more energy than desired. In this manner, the output voltage $V_{OUT}$ further increases from its desired value at light/no load conditions.

Figure 2:
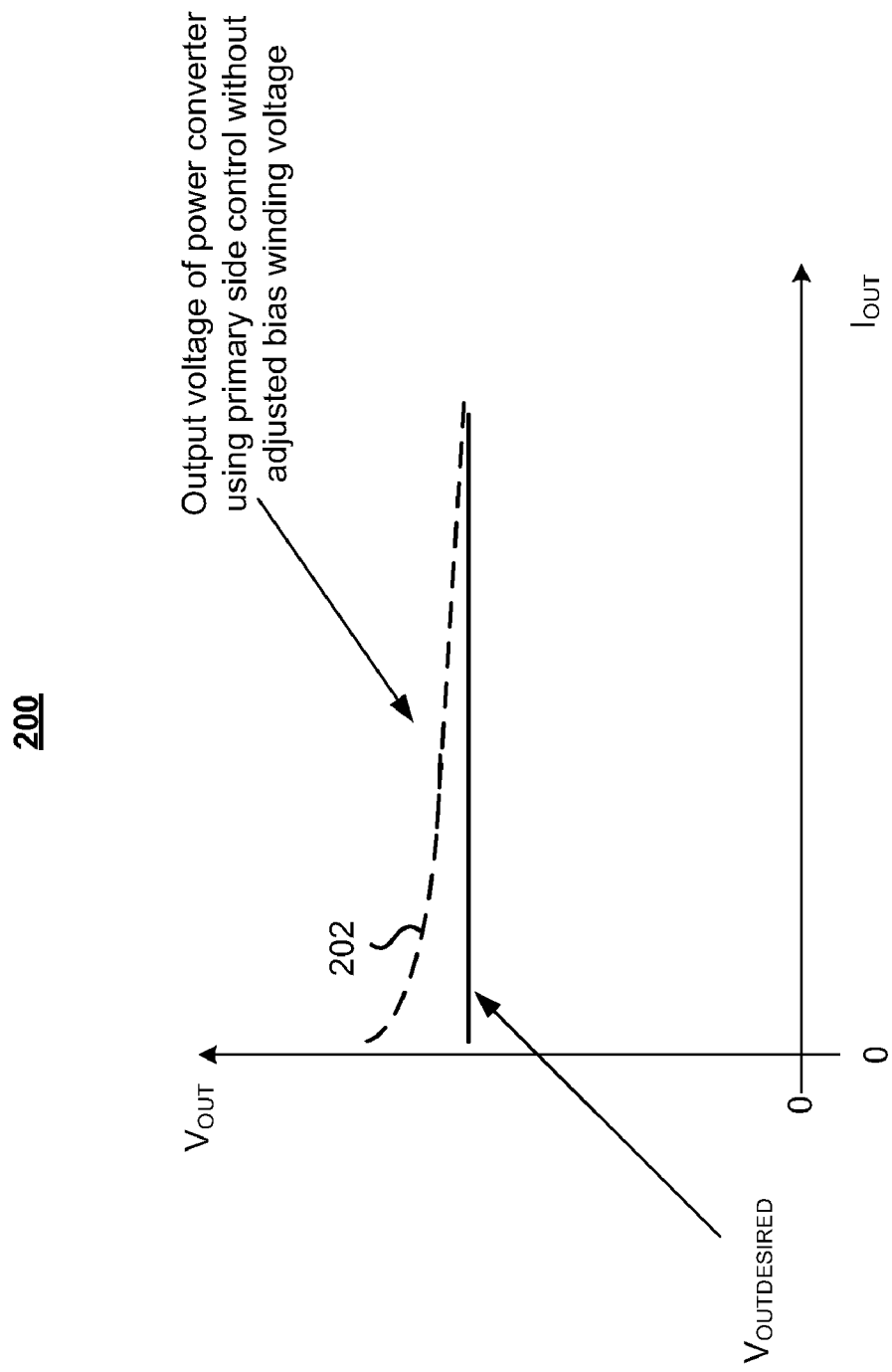
FIG. 2 is an example graph illustrating an output voltage of a primary feedback power converter without adjusting the bias winding voltage waveform, in accordance with the teachings of the present invention.

Referring now to FIG. 2, a graph 200 illustrates an output voltage plot 202 representative of output voltage $V_{OUT}$. As shown, plot 202 illustrates the nonlinear change of output voltage $V_{OUT}$ in response to output current $I_{OUT}$. This relationship is described by equation 2 below:

$$\frac{V_{OUT}}{V_{OUTDESIRED}} = 1 + \frac{L I_{SWpeak}^2}{2 V_{BIAS}^2 C_{BIAS}} \left( \frac{1}{1 + \frac{P_{OUT}}{P_{BIAS}}} \right) \quad \text{EQ. 2}$$

where $V_{OUTDESIRED}$ is representative of the desired (the regulated) output voltage (shown in FIG. 2), $V_{OUT}$ is representative of the actual output voltage at the output of power converter 100, L is representative of the inductance value of primary winding 124, $I_{SWPEAK}$ is representative of the peak switch current (shown in FIG. 1B) through power switch 106, $V_{BIAS}$ is the bias voltage, $C_{BIAS}$ is the capacitance of the bias capacitor, and $P_{OUT}$ is the amount of power ($V_{OUT}$ multiplied by $I_{OUT}$) delivered to the output of power converter 100, and $P_{BIAS}$ is the amount of power delivered to the bias winding 128 of power converter 100.

As shown in EQ. 2, the expression in parenthesis shows that the output voltage increases nonlinearly as the output power $P_{OUT}$ approaches zero. More specifically, the greatest difference between desired output voltage $V_{OUTDESIRED}$ and output voltage $V_{OUT}$ is at light/no load conditions. While power converter 100 is operating, the goal is to maintain $V_{OUT}/V_{OUTDESIRED}$ ratio to substantially 1, in other words, to keep the output voltage $V_{OUT}$ substantially the same as the desired output voltage $V_{OUTDESIRED}$.

Referring now to FIGS. 3A and 3B, bias voltage waveforms are shown in accordance with the teachings of the present invention. As shown in FIG. 3A a first bias voltage waveform 302 is compared to a second bias winding voltage 304 to show a change between a first average bias voltage $V_{AVGBIAS1A}$ and a second average bias voltage $V_{AVGBIAS2A}$ when a voltage reference is adjusted. As shown, bias voltage waveforms 302 and 304 illustrate a ripple portion of the voltage on capacitor $C_{BIAS}$. In one example, the dc value of the bias voltage $V_{BIAS}$ may be about 20 V and the ripple voltage may be about 1 V. As further shown, a periodicity is associated with bias voltage waveform 302 and 304. One period is defined as a ripple period $T_{RIP}$. More specifically, ripple period $T_{RIP}$ identifies the time between on states of power switch 106 during regulation of bias voltage $V_{BIAS}$. More specifically, power switch 106 switches to an on state when bias voltage waveform 302 reaches a first adjustable reference value $V_{ADJREF1}$. In one example, voltage reference $V_{ADJREF1}$ may be used to regulate bias voltage $V_{BIAS}$ such that output voltage $V_{OUT}$ is indirectly regulated.

In one example, during a light/no load condition, ripple period $T_{RIP}$ is substantially greater than a switching period $T_S$. For example, the ripple period $T_{RIP}$ may consist of between 50 to 200 consecutive skipped switching periods $T_S$. As shown, at the beginning of ripple period $T_{RIP}$, waveform 302 approaches a voltage peak $V_{PEAK1A}$. More specifically, voltage peak $V_{PEAK1A}$ is reached in one switching period when diode $D_2$ of power converter 100 is conducting. In one example, the change in voltage from first reference $V_{ADJREF1}$ to voltage peak $V_{PEAK1A}$ may represent the amount of energy delivered to bias capacitor $C_{BIAS}$ of power converter 100 during a switching period $T_S$.

During the remainder of ripple period $T_{RIP}$, voltage in waveform 302 is decreasing until reference voltage $V_{ADJREF1}$ is reached. More specifically, bias voltage of waveform 302 decreases at a rate based on an RC time constant that is determined by the values of $R_1$, $R_2$, and $C_{BIAS}$. As shown in one example by waveform 302, during operation of power converter 100, when power switch 106 is not conducting, bias capacitor $C_{BIAS}$ discharges through resistors $R_1$ and $R_2$. Average bias winding voltage $V_{AVGBIAS1A}$ is an average voltage of bias voltage waveform 302.

As shown, voltage waveform 304 resembles voltage waveform 302 but is shifted downward. As is further illustrated, average bias voltage $V_{AVGBIAS2A}$, representative of the average voltage of bias voltage waveform 304, is shifted downwards from average bias voltage $V_{AVGBIAS1A}$. This downward shift occurs because a second voltage reference $V_{ADJREF2}$ is lower with respect to first voltage reference $V_{ADJREF1}$. In one example operation, power switch 106 switches to an on state when bias voltage waveform 304 reaches a second reference value $V_{ADJREF2}$. As shown, at the beginning of ripple period $T_{RIP}$, waveform 304 approaches a voltage peak $V_{PEAK2A}$. More specifically, voltage peak $V_{PEAK2A}$ is reached in one switching period when diode $D_2$ of power converter 100 is conducting. During the remainder of ripple period $T_{RIP}$, voltage of waveform 304 is decreasing until reference voltage $V_{ADJREF2}$ is reached. As shown, ripple of voltage waveform 304 has been reduced from first voltage peak $V_{PEAK1A}$ to second voltage peak $V_{PEAK2A}$ by lowering the voltage reference from first voltage reference $V_{ADJREF1}$ to second voltage reference $V_{ADJREF2}$. As shown, the change in voltage between a first reference voltage $V_{ADJREF1}$ and first peak voltage $V_{PEAK1A}$ is the same change in voltage between a second reference voltage $V_{ADJREF2}$ and second peak voltage $V_{PEAK2A}$. This is because the energy delivered to bias capacitor $V_{BIAS}$ per switching period $T_S$ has not substantially changed. In other words, only the magnitude of the peak voltage has changed from first peak voltage $V_{PEAK1A}$ to second peak voltage $V_{PEAK2A}$. In this manner, first average bias voltage $V_{AVGBIAS1A}$ has been reduced to second average bias voltage $V_{AVGBIAS2A}$. In one example according to the teachings of the present invention, bias voltage $V_{BIAS}$ is adjusted in response to a load condition or, in other words, the amount of output power $P_{OUT}$ demanded by load 119. Since, the output voltage $V_{OUT}$ is regulated, a change in load may also be referred to as a change in output current $I_{OUT}$. In one example, a feedback voltage reference in controller 104 may be adjusted nonlinearly to substantially compensate for the rise in output voltage $V_{OUT}$ at light/no load conditions.

Referring now to FIG. 3B, a first bias voltage waveform 310 is compared to a second bias voltage waveform 312 to illustrate a change between a first average bias voltage $V_{AVGBIAS1B}$ and a second average bias voltage $V_{AVGBIAS2B}$ when a current limit $I_{LIMIT}$ to control the peak switch current $I_{SWPEAK}$ is adjusted. As shown, bias voltage waveforms 310 and 312 illustrate the ripple portion of voltage on capacitor $C_{BIAS}$. As further shown, a periodicity is associated with bias voltage waveform 310 and 312. A first ripple period $T_{RIP1}$ corresponds with voltage waveform 310 and a second ripple period $T_{RIP2}$ corresponds with voltage waveform 312. In operation, power switch 106 is allowed to switch to an on state during the next switching period $T_S$, when bias voltage waveform 302 reaches a reference value $V_{ADJREF}$. In one example, current limit $I_{LIMIT}$ may be used to regulate bias voltage $V_{BIAS}$ such that output voltage $V_{OUT}$ is indirectly regulated.

As shown, at the beginning of ripple period $T_{RIP1}$, waveform 310 approaches a voltage peak $V_{PEAK1B}$. More specifically, voltage peak $V_{PEAK1B}$ is reached in one switching period when diode $D_2$ of power converter 100 is conducting. In one example, the change in voltage in waveform 310 from voltage reference $V_{ADJREF}$ to first voltage peak $V_{PEAK1B}$ may represent the amount of energy delivered to bias capacitor $C_{BIAS}$ of power converter 100 during a switching period $T_S$. During the remainder of ripple period $T_{RIP1}$, voltage waveform 310 drops until reference voltage $V_{ADJREF}$ is reached. Average bias winding voltage $V_{AVGBIAS1B}$ is an average voltage of bias voltage waveform 310.

As shown, the average of voltage waveform 312 is shifted downward from voltage waveform 310 as a result of peak voltage $V_{PEAK1B}$ shifting down to voltage peak $V_{PEAK2B}$. As is further illustrated, average bias voltage $V_{AVGBIAS2B}$, representative of the average voltage of bias voltage waveform 312, is also shifted downwards. During an on state, power switch 106 limits switch current $I_{SW}$ in response to a current limit $I_{LIMIT}$. In one example, adjusting the current limit $I_{LIMIT}$ in controller 104 changes the amount of energy delivered to bias winding 128 during an enabled switching period $T_S$. This relationship between energy and peak current is represented in equation 3 below:

$$E = \frac{1}{2}LI_{SWPEAK}^2 \qquad \text{EQ. 3}$$

where E is the energy delivered during a switching period, L is the inductance of primary winding 124, and $I_{SWPEAK}$ is the peak current in power switch 106. In this manner, a change in peak voltage may be controlled across bias capacitor $C_{BIAS}$, thus controlling an average bias voltage.

As shown, at the beginning of ripple period $T_{RIP2}$, waveform 312 approaches voltage peak $V_{PEAK2B}$. More specifically, voltage peak $V_{PEAK2B}$ is reached in one switching period when diode $D_2$ of power converter 100 is conducting. During the remainder of ripple period $T_{RIP2}$, voltage of waveform 312 is decreasing until reference voltage $V_{ADJREF}$ is reached. As shown, ripple of voltage waveform 312 has been reduced from first voltage peak $V_{PEAK1B}$ to second voltage peak $V_{PEAK2B}$ by lowering the current limit $I_{LIMIT}$ in controller 104 such that switch current $I_{SW}$ through power switch 106 is limited.

In one example according to the teachings of the present invention, bias voltage $V_{BIAS}$ is adjusted in response to a load condition, in other words bias voltage $V_{BIAS}$ is adjusted in response to the amount of output power $P_{OUT}$ demanded by load 119. Since output voltage $V_{OUT}$ is kept regulated, a change in load may also be referred to as a change in output current $I_{OUT}$. In one example, a feedback voltage reference in controller 104 may be adjusted nonlinearly to substantially reduce the rise in output voltage $V_{OUT}$ at light/no load conditions.

Figure 4:
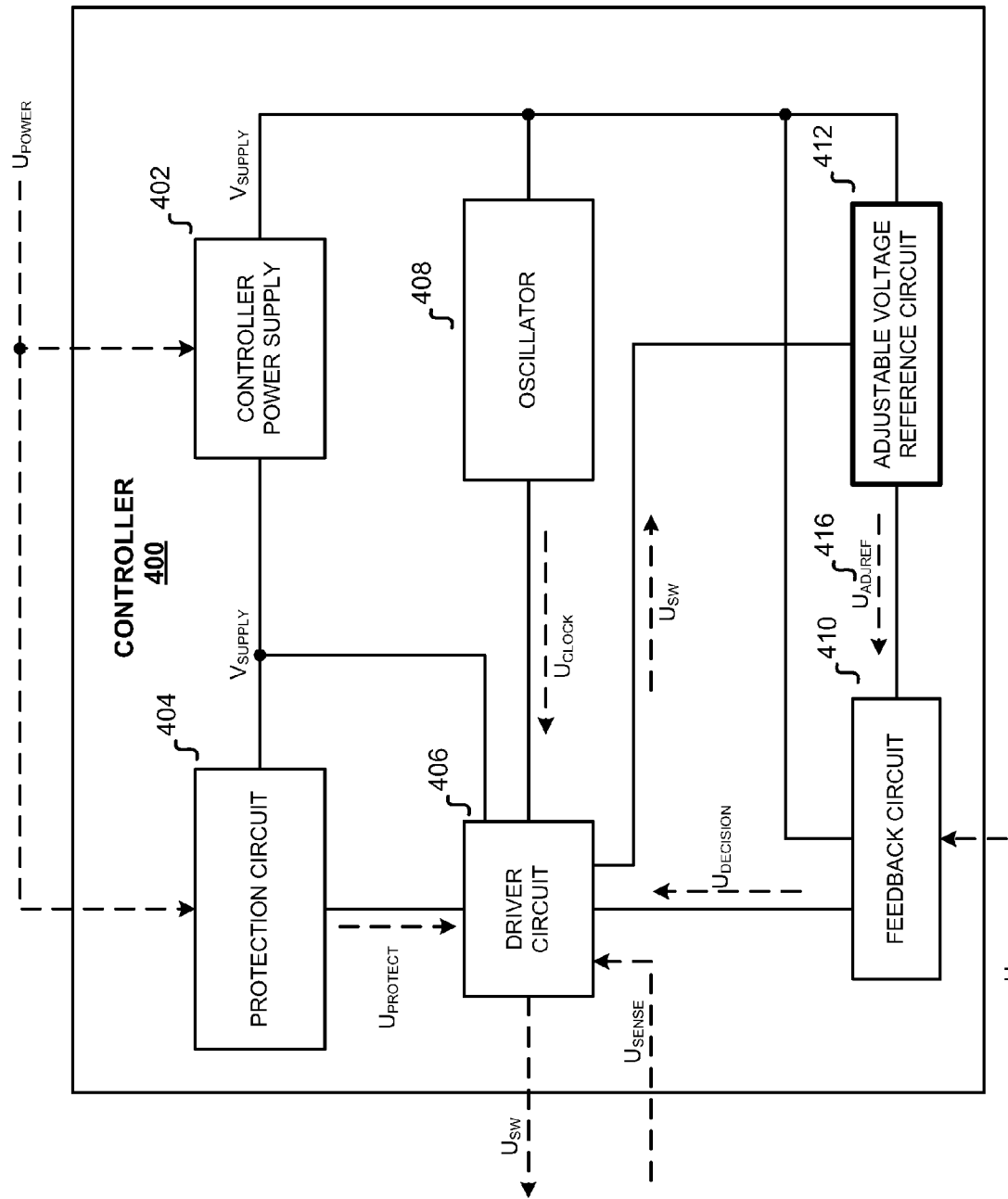
FIG. 4 is a functional block diagram of an example controller for adjusting a voltage reference to change a bias voltage, in accordance with the teachings of the present invention.

Referring now to FIG. 4, an example controller 400 is illustrated in accordance with the teachings of the present invention. More specifically, controller 400 may be incorporated in a power converter to adjust a bias winding voltage by adjusting a feedback voltage reference according to the teachings of the present invention. The illustrated example of power converter 400 includes a controller power supply 402, a protection circuit 404, a driver circuit 406, an oscillator 408, a feedback circuit 410, and an adjustable voltage reference circuit 412. As shown, controller 400 receives a power signal $U_{POWER}$, a feedback signal $U_{FB}$ and outputs a switching signal $U_{SW}$ to switch a power switch. In one example, controller 400, power signal $U_{POWER}$, feedback signal $U_{FB}$, and switching signal $U_{SW}$ may represent possible implementations of controller 104, power signal $U_{POWER}$, feedback signal $U_{FB}$, and switching signal $U_{SW}$, respectively of FIG. 1A.

As shown, controller power supply 402 is coupled to supply power to operate protection circuitry 404, driver circuitry 406, oscillator 408, feedback circuitry 410, and adjustable voltage reference circuit 412. In one example, protection circuit 404 is coupled to driver circuit 406 and outputs a protection signal $U_{PROTECT}$ to inhibit operation of switching signal $U_{SW}$ in the event circuitry in controller 400 is receiving inadequate voltage or excessive voltage. As shown, oscillator 408 is coupled to driver circuit 406. In operation, oscillator 408 outputs a clock signal $U_{CLOCK}$ that sets the time period of a switching period of a power switch in a power converter. In one example, clock signal $U_{CLOCK}$ indicates a beginning of each switching period so that driver circuit 406 is able to decide to enable or disable the next switching period. An 'enabled' switching period may be defined as a switching period in which a power switch of a power converter is able to conduct current for a portion of that switching period. A 'disabled' switching period may be defined as a switching period in which a power switch of a power converter cannot conduct current.

As shown, feedback circuit 410 feedback signal $U_{FB}$. In one example, feedback signal $U_{FB}$ is representative of a bias voltage $V_{BIAS}$ which is indirectly representative of an output voltage of a power converter. Feedback circuit 410, is coupled to driver circuit 406 and is coupled to output decision signal $U_{DECISION}$. In operation, decision signal $U_{DECISION}$ may be used by driver circuit 406 to regulate a voltage across a bias capacitor, thus indirectly regulating an output voltage of a power converter. In one example, feedback circuit 410 compares feedback signal $U_{FB}$, representative of a bias voltage, to a reference (not shown). If a bias voltage falls below a voltage reference, then decision signal $U_{DECISION}$ will indicate to driver circuit 406 to switch a power switch of a power converter to deliver more energy to the output. In this manner, decision signal $U_{DECISION}$ determines whether a switching period should be enabled or disabled. As shown, adjustable voltage reference circuit 412 is coupled to driver circuit 406 and feedback circuit 410. In operation, adjustable voltage reference circuit 412 outputs an adjustable voltage reference signal $U_{ADJREF}$ which adjusts a feedback reference voltage in feedback circuit 410. Adjustable voltage reference circuit 412 receives switching signal $U_{SW}$ from driver circuit 406 to determine the load at the output of a power converter. In one example, adjustable voltage reference circuit 412 determines the amount to adjust the voltage reference in feedback circuit 410 in response to an output current drawn by a load coupled to an output of a power converter. In operation, adjustable voltage reference circuit 412 may determine the output current drawn by a load based on the effective switching frequency. More specifically, the effective switching frequency may be defined as the average switching frequency of a power switch over several switching periods. The switching signal received by adjustable voltage reference circuit 412 allows for an effective switching frequency to be determined. In one example, the adjustable voltage reference circuit 412 adjusts the voltage reference of feedback circuit 410 nonlinearly in response to a load condition of a load coupled to the output of a power converter.

Figure 5:
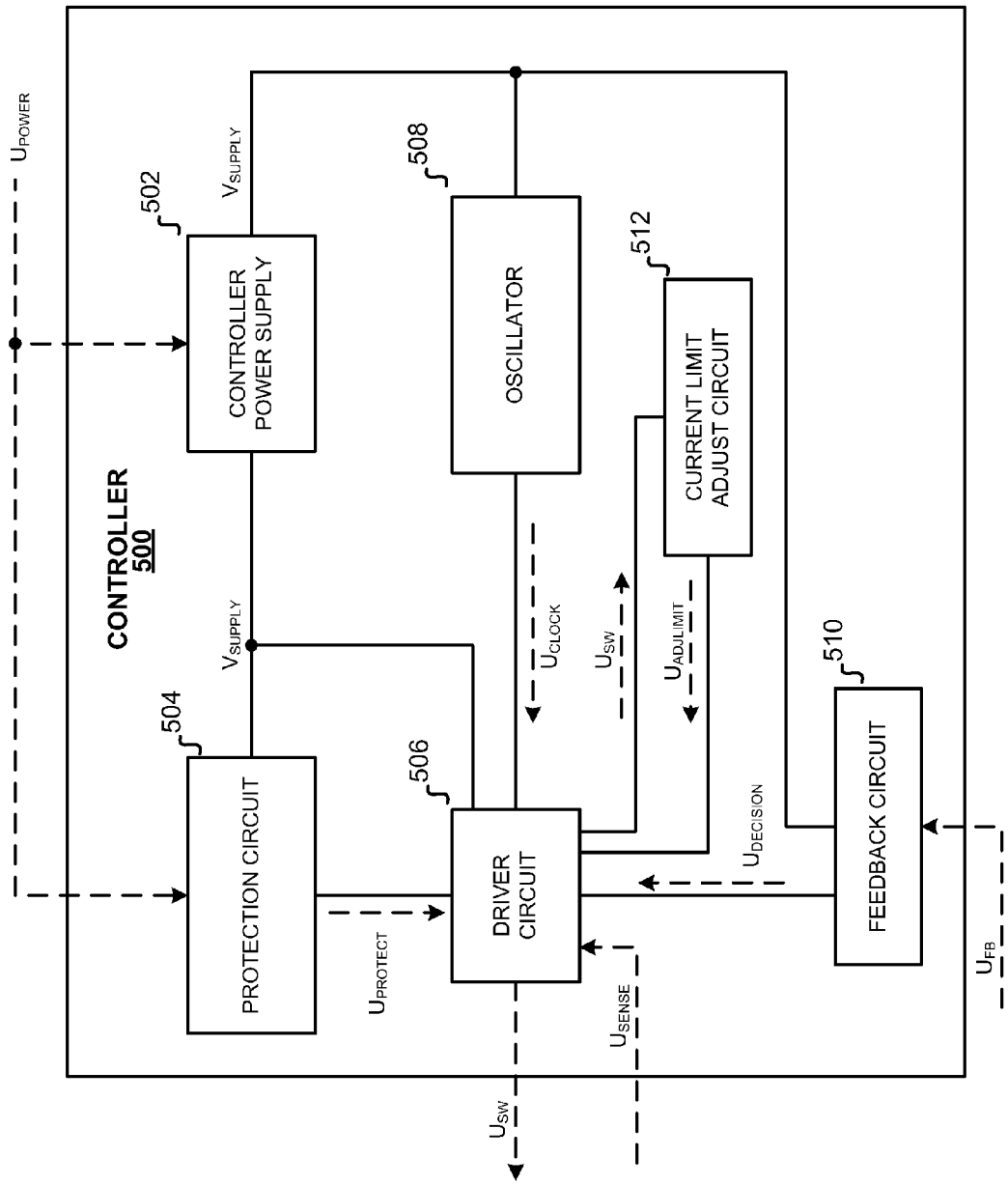
FIG. 5 is a functional block diagram of an example controller for adjusting a current limit to change a bias voltage, in accordance with the teachings of the present invention.

Referring now to FIG. 5, an example controller 500 is illustrated in accordance with the teachings of the present invention. More specifically, controller 500 may be incorporated in a power converter to adjust a bias winding voltage by adjusting a current limit of a power switch according to the teachings of the present invention. In operation, controller 500 controls the peak current through a power switch of a power converter. By adjusting the current limit in controller 500 the peak current through a power switch can be controlled, thus adjusting the bias winding voltage. In one example, switching signal $U_{SW}$ will be output from driver circuit 506 to disable a power switch when current sense signal $U_{SENSE}$ detects a switch current in a power switch that has reached a current limit. The illustrated example of power converter 500 includes a controller power supply 502, a protection circuit 504, a driver circuit 506, an oscillator 508, feedback circuitry 510, and a current limit adjust circuit 512. As shown, controller 500 receives a power signal $U_{POWER}$, a feedback signal $U_{FB}$, and a current sense signal $U_{SENSE}$, and outputs a switching signal $U_{SW}$ to switch a power switch. In one example, controller power supply 502, protection circuit 504, driver circuit 506, oscillator 508, and feedback circuit 510, power signal $U_{POWER}$, feedback signal $U_{FB}$, and switching signal $U_{SW}$ may represent possible implementations of controller power supply 402, protection circuit 404, driver circuit 406, oscillator 408, and feedback circuit 410, power signal $U_{POWER}$, feedback signal $U_{FB}$, and switching signal $U_{SW}$, respectively of FIG. 4.

As shown, driver circuit 506 receives a sense signal $U_{SENSE}$. In one example, sense signal $U_{SENSE}$ is representative of a switch current conducting through a power switch of a power converter. In operation, driver circuit 506 controls the current through power switch to adjust a voltage across a bias winding of a power converter. In one example, driver circuit 506 adjusts the current limit of a power switch in response to an output current delivered to a load coupled to an output of a power converter. As shown, current limit adjust circuit 512 is coupled to driver circuit 506. In operation, current limit adjust circuit 512 outputs an adjusted current limit signal $U_{ADJLIMIT}$ which adjusts the current limit in driver circuit 506. Current limit adjust circuit 512 receives switching signal $U_{SW}$ from driver circuit 506 to determine the load at the output of a power converter. In one example, current limit adjust circuit 512 determines how much to adjust the current limit in driver circuit 506 in response to the output current drawn by a load coupled to the output of a power converter. In operation, current limit adjust circuit 512 may determine the output current drawn by a load based on the switching signal $U_{SW}$. In one example, current limit adjust circuit may determine the effective switching frequency of a power switch from switching signal $U_{SW}$. In one example, the current limit adjust circuit 512 adjusts the current limit of driver circuit 506 nonlinearly in response to a load condition of a load coupled to the output of a power converter.

Figure 6:
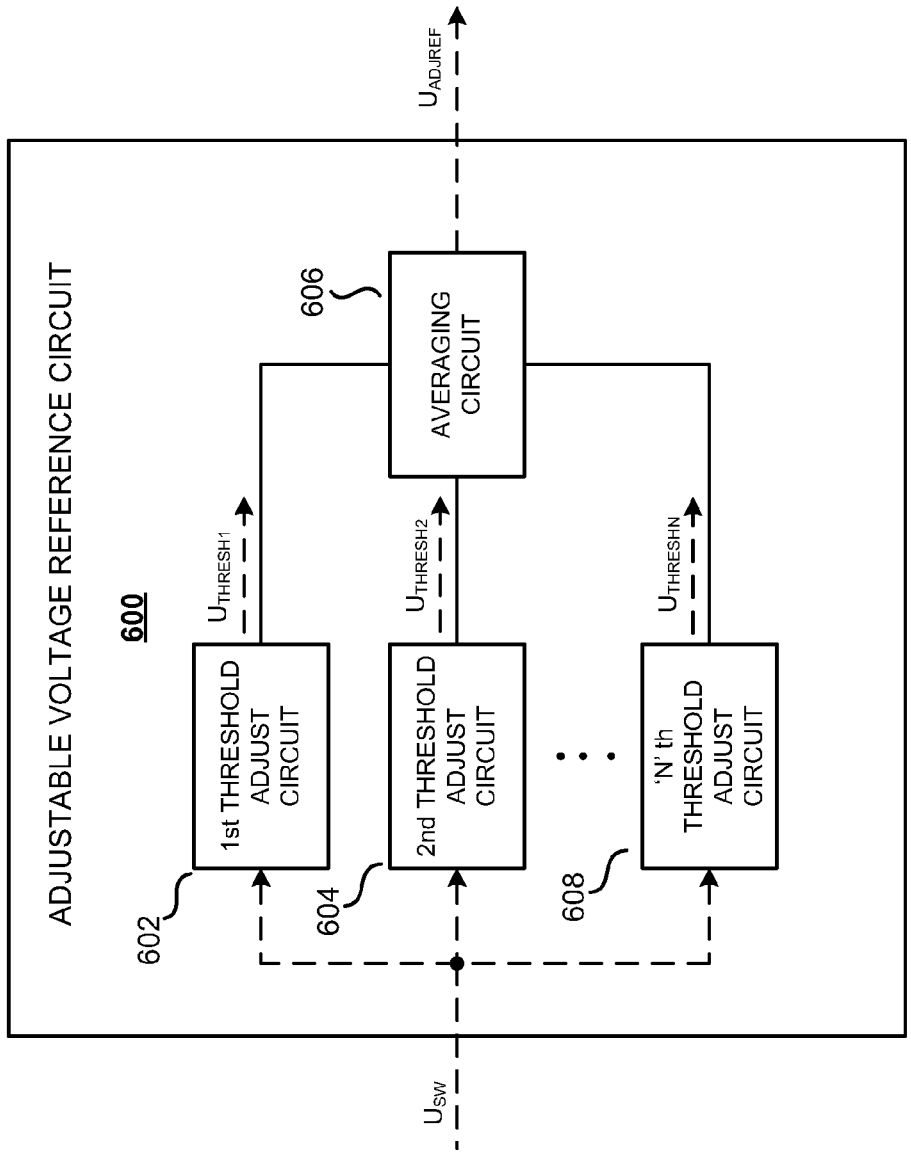
FIG. 6 is a functional block diagram illustrating an example adjustable voltage reference circuit, in accordance with the teachings of the present invention.

Referring now to FIG. 6, an example adjustable reference voltage circuit 600 is illustrated in accordance with the teachings of the present invention. The illustrated example of adjustable reference voltage circuit 600 includes a first threshold adjust circuit 602, a second threshold adjust circuit 604, 'Nth' threshold adjust circuit 608, and averaging circuit 606. As shown, adjustable voltage reference circuit 600 is coupled to receive a switching signal $U_{SW}$ representative of a switching of a power switch, and is coupled to output an adjustable voltage reference signal $U_{ADJREF}$. In one example, adjustable voltage reference 600 may be a possible implementation of adjustable voltage reference in FIG. 4. In another example, adjustable voltage reference signal $V_{ADJREF}$ and switching signal $U_{SW}$ may represent possible implementations of adjustable voltage reference signal $V_{ADJREF}$ and switching signal $U_{SW}$ respectively of FIGS. 1 and 4. As shown, first threshold adjust circuit 602 is coupled to averaging circuit 606 and is coupled to receive a switching signal representative of the switching of a power switch of a power converter. In operation, first threshold adjust circuit 602 outputs a first threshold adjust signal $U_{THRESH1}$ representative of a first adjustment to a reference threshold. In one example, first threshold adjust circuit 602 determines a first load condition and outputs a first threshold adjust signal $U_{THRESH1}$, representative of a load below the first load condition, to averaging circuit 606. In another example, second threshold adjust circuit 604 determines a second load condition and outputs a second threshold adjust signal $U_{THRESH2}$, representative of a load below the second load condition to averaging circuit 606. First and second adjust circuits 602 and 604 respectively, may determine a load condition in response to an effective switching frequency.

As shown, an averaging circuit 606 outputs an adjusted reference signal $U_{ADJREF}$ in response to a first and second threshold adjust signal $U_{THRESH1}$ and $U_{THRESH2}$. In one example, averaging circuit 606 outputs adjusted reference voltage signal $U_{ADJREF}$ in response to calculating the average of the threshold adjust signals over a substantially large number of switching periods. Therefore, adjusted voltage reference signal $U_{ADJREF}$ changes gradually in magnitude and can be considered substantially constant over a few switching periods. As shown, additional threshold circuits may be added such that there are 'N' threshold adjusts circuits, to contribute to adjustable voltage reference $U_{ADJREF}$. By adding a second threshold adjust circuit the averaging circuit 606 non-linearly adjusts the adjustable voltage reference $U_{ADJREF}$ in response to a switching signal. More specifically, the switching signal may be used to determine the load condition coupled to the output of a power converter.

Figure 7:
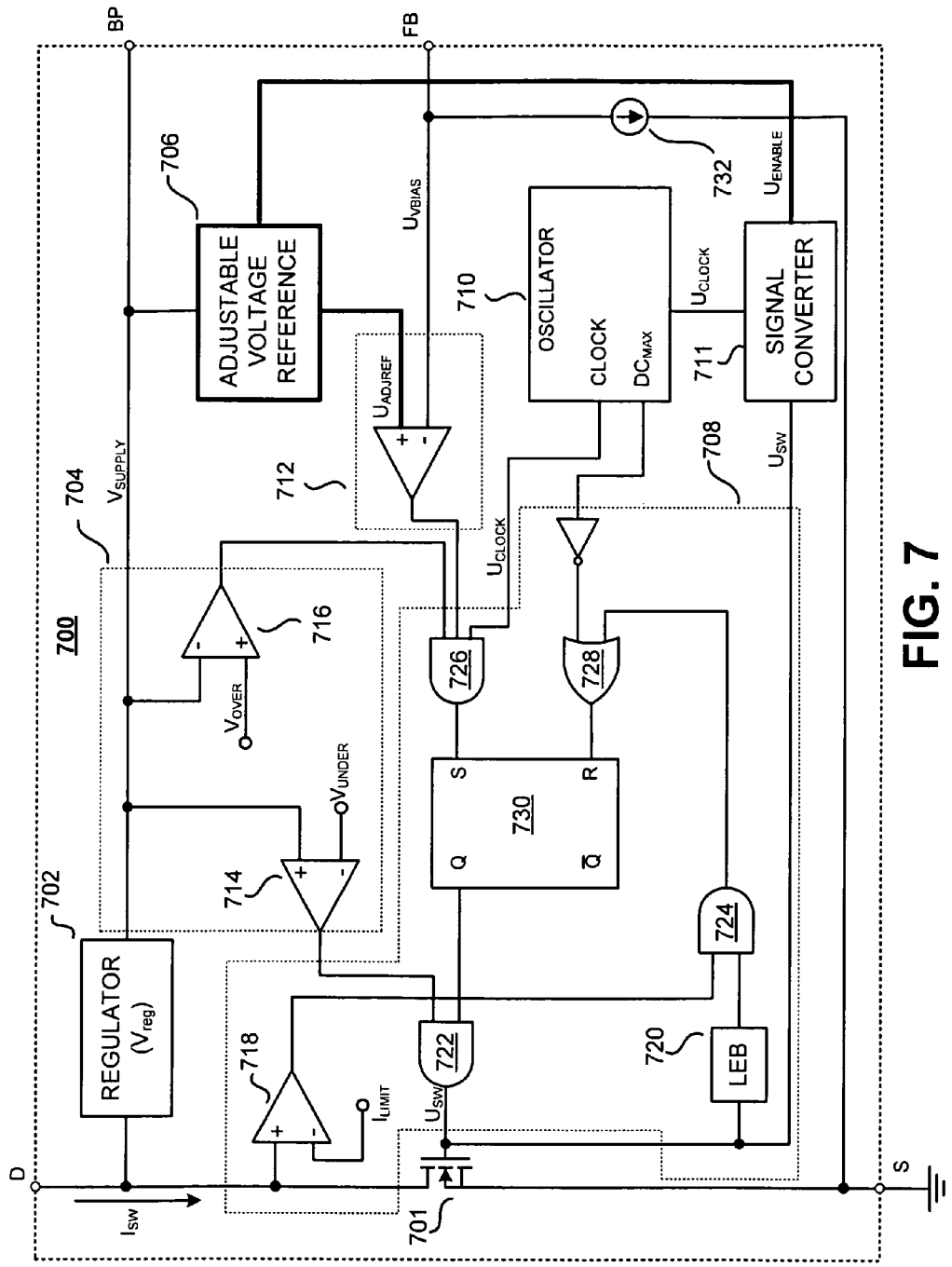
FIG. 7 is a functional block diagram illustrating an example integrated circuit including a power switch and a controller, in accordance with the teachings of the present invention.

Referring now to FIG. 7, a schematic of an example integrated circuit 700 for a power converter is illustrated in accordance to the teachings of present invention. As shown, integrated circuit 700 includes a drain terminal D, a source terminal S, a bypass terminal BP, and a feedback terminal FB. Integrated circuit 700 further includes a power switch 701, regulator 702 (to regulate $V_{SUPPLY}$), a protection circuit 704, an adjustable voltage reference circuit 706, a driver circuit 708, an oscillator 710, a signal converter 711, and a feedback circuit 712. In one example, protection circuit 704, driver circuit 708, adjustable voltage reference circuit 706, oscillator 710 and feedback circuit 712 may represent possible implementations of their corresponding counterparts in FIGS. 4 and 5. Protection circuit 704 further includes a first comparator 714 and a second comparator 716. Driver circuit 708 further includes a current limit comparator 718, a leading edge blanking LEB circuit 720, a first AND gate 722 an second AND gate 724, a third AND gate 726, an OR gate 728, and an RS flip-flop 730.

As shown, power switch 701 is coupled between drain terminal D and source terminal S. In operation, a switch current flows through power switch 701, when power switch is in an ON state and able to conduct current. A regulator 702 is coupled directly to the drain terminal D to receive power to supply to the circuitry in integrated circuit 700. Although not shown, regulator 702 is coupled to provide a regulated supply voltage to supply power for operation to components in integrated controller 700. A first comparator 714 is coupled to regulator 702. In operation, comparator 714 compares a supply voltage $V_{SUPPLY}$ to an under-voltage reference $V_{UNDER}$. In the event that supply voltage $V_{SUPPLY}$ drops below under-voltage reference $V_{UNDER}$, comparator 714 will output a low signal to AND gate 722 thus inhibiting the switching of power switch 701. As shown, a second comparator 716 is coupled to regulator 702. In operation, comparator 716 compares supply voltage $V_{SUPPLY}$ to over-voltage reference $V_{OVER}$. In the event supply voltage $V_{SUPPLY}$ is greater than over-voltage reference $V_{OVER}$, comparator 716 will output a low signal to AND gate 726 thus inhibiting the turning on of power switch 701.

As shown, adjustable voltage reference circuit 706 is coupled to feedback circuit 712 and coupled to receive enable signal $U_{ENABLE}$ from signal converter 711. In one example, enable signal $U_{ENABLE}$ is determined from switching signal $U_{SW}$, and is high for an entire enabled switching period $T_S$ and will be low for an entire disabled switching period $T_S$. In another example, voltage reference circuit 706 may directly receive switching signal $U_{SW}$. In operation, adjustable voltage reference circuit 706 adjusts a voltage reference of feedback circuit 712 in response to a load condition at the output of a power converter. More specifically, adjustable voltage reference circuit 706 determines the load condition in response to receiving enable signal $U_{ENABLE}$ from signal converter 711. As shown a feedback circuit 712 is coupled to feedback pin FB and adjustable voltage reference circuit 706. In operation, feedback circuit 712 outputs a low signal when the bias winding voltage signal $U_{VBIAS}$ is greater than adjustable voltage reference $U_{ADJREF}$ to inhibit switching of power switch 701. As shown, oscillator 710 is coupled to AND gate 726 and RS flip flop 730. In operation, oscillator 710 outputs a clock signal $U_{CLOCK}$ to set the switching frequency of power switch 701. In one example $U_{CLOCK}$ is a fixed signal. Oscillator 710 is further coupled to output a maximum duty cycle signal $DC_{MAX}$ to prevent power switch 701 from being in an on state for a defined time. More specifically, a duty cycle is the ratio of on time of power switch 701 to total time of a switching period $T_S$.

As shown, current limit comparator 718 is coupled to AND gate 724. In operation, current limit comparator 718 compares a switch current $I_{SW}$ to a current limit $I_{LIMIT}$. When switch current reaches current limit $I_{LIMIT}$, comparator 718 outputs a high signal to turn power switch 701 to an OFF state. In this manner, the switch current through power switch 701 is controlled. As shown a leading edge blanking (LEB) circuit 720 is coupled to the output of AND gate 722 and input of AND gate 724. In operation, leading edge blanking circuit 720 prevents power switch 701 from turning off due to a spike in current when the power switch 701 turns on. More specifically, LEB circuit 720 provides a delay at the beginning of each ON time such that an overshoot in current does not cause current limit comparator 718 to switch power switch to an OFF state prematurely.

As shown, OR gate 728 is coupled to output a signal to switch power switch 701 from an ON state to an OFF state. AND gate 726 is coupled to output a signal to switch power switch 701 from an OFF state to an ON state. As shown, RS flip flop 730 is coupled to AND gate 726 and OR gate 728. In operation, RS flip flop 730 is coupled to outputs a switching signal $U_{SW}$ in response to outputs from AND gate 726 and OR gate 728. A current source 732 is coupled to sink current from feedback terminal FB.

Figure 8:
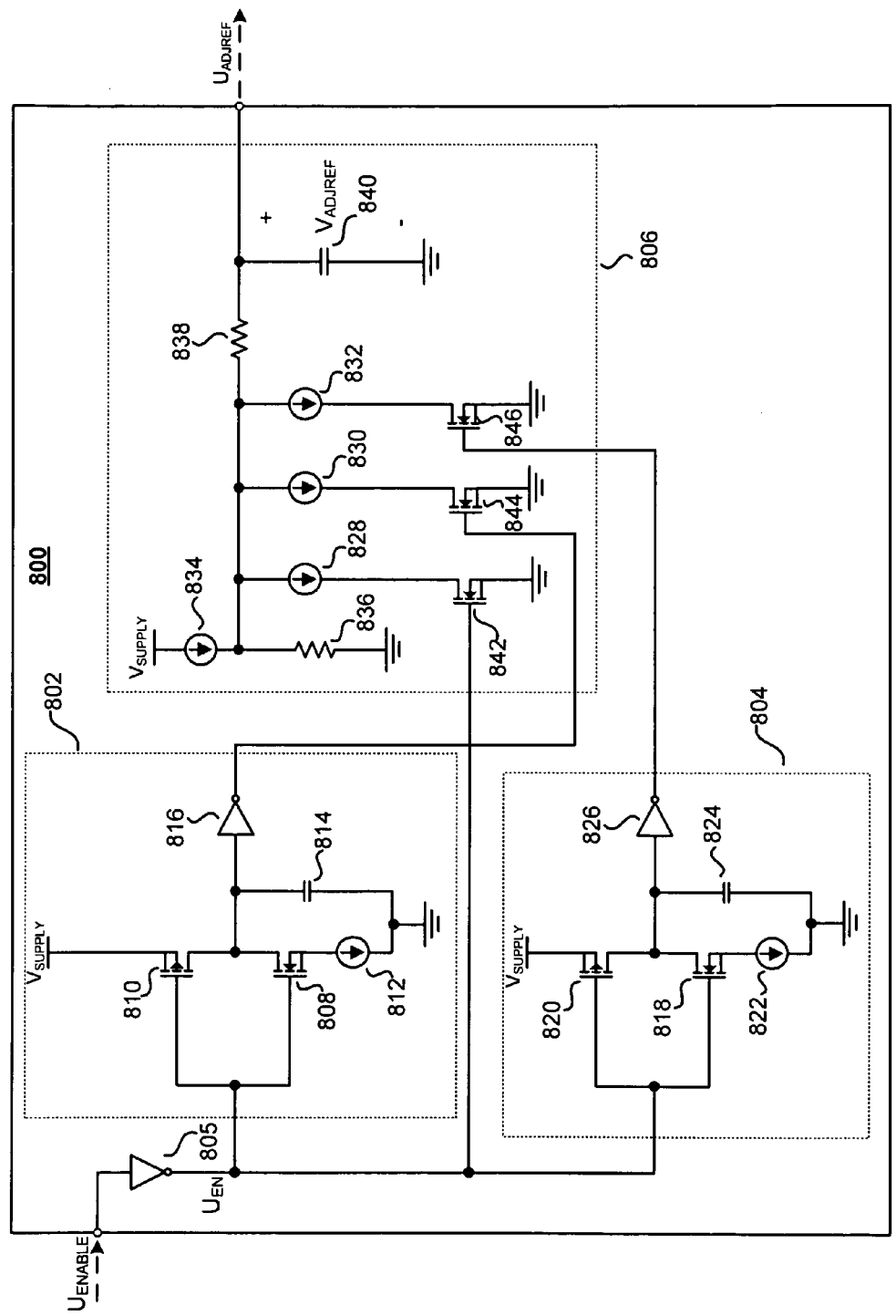
FIG. 8 is an example schematic of an adjustable voltage reference circuit, in accordance with the teachings of the present invention.

Referring now to FIG. 8, an example adjustable voltage reference circuit 800 is illustrated in accordance with the teachings of the present invention. As shown, adjustable voltage reference circuit 800 includes a first threshold adjust circuit 802, a second threshold adjust circuit 804, an inverter 805, and an averaging circuit 806. In one example, threshold adjust circuit 802, threshold adjust circuit 804, and adjuster circuit 806 maybe possible implementations of first threshold adjust circuit 602, second threshold adjust circuit 604, and averaging circuit 606 respectively of FIG. 6. As shown, threshold adjust circuit 802 includes an n-channel transistor 808, a p-channel transistor 810, a current source 812, capacitor 814, and an inverter 816. Similarly, threshold adjust circuit 804 includes an n-channel transistor 818, a p-channel transistor 820, a current source 822, capacitor 824, and an inverter 826. As further shown, averaging circuit 806 includes current source 828, current source 830, current source 832, current source 834, resistor 836, resistor 838, capacitor 840, n-channel transistor 842, n-channel transistor 844, and n-channel transistor 846. More specifically, n-channel and p-channel transistors perform opposite functions, such that a logic signal that causes an n-channel to turn on will cause a p-channel to turn off.

As shown, transistor 842 is coupled to receive an inverted enable signal $U_{\overline{EN}}$. According to one embodiment, enable signal $U_{ENABLE}$ is representative of an enabled or disabled switching period. More specifically, enable signal $U_{ENABLE}$ is high throughout the whole switching period in which a power switch has conducted (enabled period) and low throughout the whole switching period when the power switch is not conducting (disabled switching period). In operation, inverted enable signal $U_{\overline{EN}}$ goes high during a disabled switching period (i.e., power switch has not turned on during the switching period), and transistor 842 is turned on to conduct current. More specifically current source 828 provides current to conduct through transistor 842. In this manner, voltage across resistor 836 is reduced since the current through resistor 836 will be reduced by an amount of current from current source 828. According to the example embodiment, each time a power switch does not switch during a switching period, voltage across resistor 836 is reduced by a certain amount. In operation, capacitor 840 averages the voltage across resistor 836. In one example, when enable signal $U_{ENBLE}$ is enabled after a disabled switching period, transistor 842 turns off, allowing the full current of current source 834 to charge capacitor 840 and raise adjustable voltage reference $V_{ADJREF}$ to a maximum value. If 'x' number of switching periods are consecutively disabled, then transistor 844 will turn on and the voltage across resistor 836 will be reduced by an even greater amount for any subsequent consecutive disabled switching periods thus reducing the voltage VADJREF by at a greater rate. If 'x' number of switching periods are consecutively disabled, then transistor 846 will turn on and capacitor 840 will discharge by an even greater amount per disabled switching period. In one example 'x' number of switching periods is less than 'y' number of switching periods. For example, 'x' number of switching periods may be 5 and 'y' number of switching periods may be 10. The value of 'x' and 'y' may be determined by the size of capacitors 814 and 824, respectively. More specifically, if the size of capacitor 814 or 824 is increased, additional disabled switching periods will be needed to pass by before the voltage on capacitors 814 or 824 gets low enough to trigger either transistor 844 or 846 to further reduce adjustable reference voltage $V_{ADJREF}$. Therefore, as the output current delivered to the output of the power converter is reduced, the bias voltage will be adjusted nonlinearly by adjusting the voltage reference in this manner to keep an output voltage at the output of the power converter at its desired value. In one example, adjustable voltage circuit 800 may include additional threshold adjust circuits to improve resolution of the rate of change of the feedback voltage reference.

As shown, first voltage threshold adjuster 802 is coupled to receive an inverted enable signal $U_{\overline{EN}}$. As shown, a voltage supply $V_{SUPPLY}$ is coupled to transistor 810. During operation, when inverted enable signal $U_{\overline{EN}}$ is high, transistor 808 is turned on and transistor 810 is turned off, and capacitor 814 discharges from the initial voltage of supply voltage $V_{SUPPLY}$. When capacitor 814 has discharged for 'x' number of switching periods, inverter 816 will output a high signal. In this manner, transistor 844 is triggered to turn on and voltage across resistor 836 is reduced further for subsequent disabled switching periods, to further increase the rate of change of feedback voltage reference $V_{REF}$. Similarly, second voltage threshold adjuster 804 is coupled to receive an inverted enable signal $U_{\overline{EN}}$. As shown, a voltage supply $V_{SUPPLY}$ is coupled to transistor 820. During operation, when inverted enable signal $U_{\overline{EN}}$ is high, transistor 818 is turned ON and transistor 820 is turned OFF, and capacitor 824 discharges from supply voltage $V_{SUPPLY}$. When capacitor 824 has discharged for 'y' number of switching periods, inverter 826 will output a high signal. In this manner, transistor 846 is triggered to turn ON and voltage on capacitor 840 is reduced to further increase the rate of change of feedback voltage reference $V_{REF}$. As shown, capacitor 840 is coupled to discharge through resistor 838 and resistor 836. In one example, capacitor 840 has a relatively high time constant with respect to the time frame of a switching period of a power switch. This allows for the voltage reference $V_{REF}$ to change gradually over multiple switching periods. In one example the value of resistor 838 is 14 M Ohms and the value of capacitor 840 is 14 pF.

Figure 9:
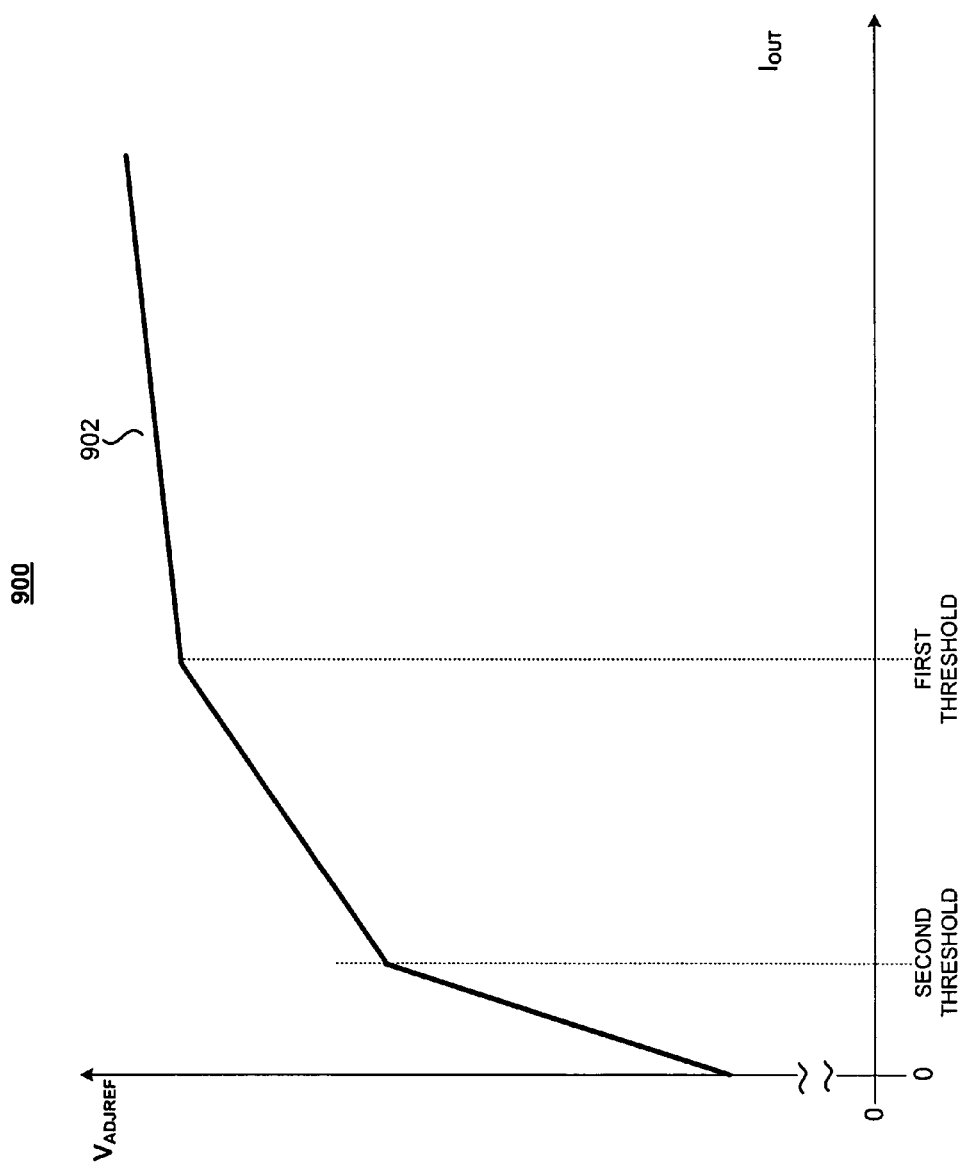
FIG. 9 is a graph illustrating a relationship between an adjusted voltage reference in FIG. 8 in response to output current of a power converter, in accordance with the teachings of the present invention.

Referring now to FIG. 9, a graph 900 illustrates the voltage reference $V_{REF}$ of FIG. 8 in response to load conditions. As shown, the change of voltage reference waveform 902 without output current $I_{OUT}$ is greater for output currents closer to zero. That is, in the illustrated example, the slope of voltage reference waveform 902 is greatest for output currents between zero and the second threshold. Voltage reference waveform 902 further includes a different (e.g., smaller) slope for output currents between the second and first thresholds and a third slope (e.g., even smaller) for output currents greater than the first threshold. Thus, in one example, a nonlinear adjustment of the reference voltage may include a plurality of linear segments each with differing slopes. In this manner, the adjustable voltage reference is designed in a piecewise linear way to more accurately maintain the desired output voltage at the output of a power converter.

Figure 10:
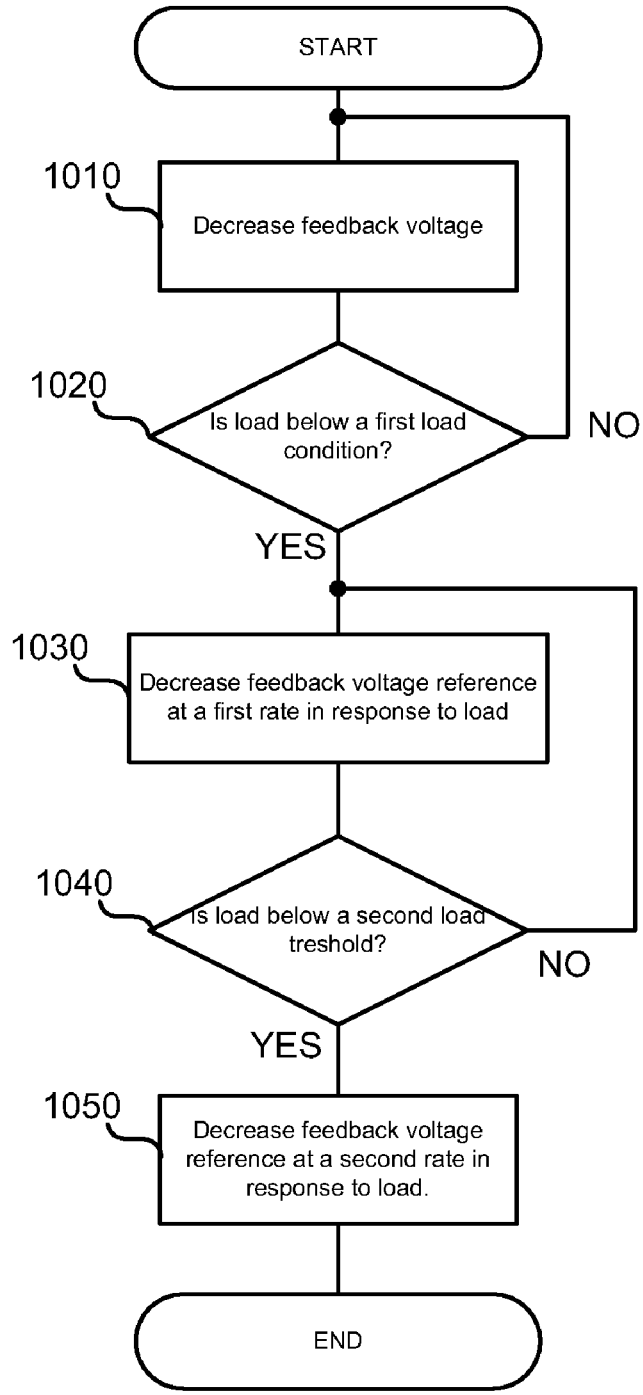
FIG. 10 is a flow chart illustrating a method to adjust a bias voltage in response to output current, in accordance with the teachings of the present invention.

Referring now to FIG. 10, a flow chart illustrates a method 1000 to improve regulation for a primary side feedback power converter. More specifically, method 1000 reduces an adjustable reference voltage nonlinearly such that a bias voltage is reduced nonlinearly in response to a load condition. In process block 1010, a controller regulates an output voltage of a power converter in response to the adjustable voltage reference. In decision block 1020, if a load is less than a first load condition, then method 1000 proceeds to decision block 1030. Otherwise, method 1000 proceeds back to decision block 1010. In one example, a first load condition may be determined in response to the switching frequency of a power switch in a power converter. During process block 1030, control initiates reduction of the adjustable reference voltage at a first rate in response to load. In process block 1040, it is determined if the load is below a second load condition. If the load is below the second load condition, method 1000 proceeds to block 1050. Otherwise, method 1000 proceeds back to 1030. In process block 1050, the rate of reduction of the adjustable reference voltage is further increased in response to a load. In one example, the second rate is higher than a first rate. During operation, as a load condition moves towards a no load condition (zero output power consumed by load), the adjustable reference voltage will be reduced at a faster rate in response to load. In one example, more than two rates to adjust the adjustable reference voltage may be used. As mentioned above, by adjusting the feedback voltage reference, the bias winding voltage is adjusted. Since a proportional relationship exists between the adjustable reference voltage and bias voltage, in this manner, method 1000 nonlinearly adjusts a bias voltage in response to a load condition.

What is claimed is:

1. A controller for a primary side control power converter, the controller comprising:
a driver circuit coupled to output a switching signal to switch a power switch between an ON state and an OFF state to regulate an output of the power converter;
a feedback circuit coupled to the driver circuit wherein the feedback circuit is coupled to output an enable signal to switch the power switch to an ON state in response to an output voltage signal; and
an adjustable voltage reference circuit coupled to adjust a voltage reference such that a bias winding voltage of the power converter is adjusted nonlinearly in response to a load condition at the output of the power converter, wherein the adjustable voltage reference circuit is further coupled to detect the load condition in response to the switching signal.

2. The controller of claim 1, wherein a current sensor outputs a current sense signal representative of a switch current through the power switch, wherein the driver circuit limits the current in the power switch in response to the load condition.

3. The controller of claim 1, further comprising an oscillator coupled to the driver circuit, wherein the oscillator outputs a clock signal to set a substantially constant switching period of the power switch.

4. The controller of claim 3, wherein the adjustable voltage reference circuit is further coupled to determine the load condition in response to an effective switching frequency of the power switch.

5. The controller of claim 4, wherein the voltage reference is adjusted in response to the effective switching frequency of the switch.

6. The controller of claim 3, wherein the adjustable voltage reference circuit further includes a first threshold adjust circuit, wherein the threshold adjust circuit adjusts the voltage reference by a first amount in response to a first load condition.

7. The controller of claim 4, wherein the adjustable voltage reference circuit further includes a second threshold adjust circuit, wherein the second threshold adjust circuit adjusts the voltage reference by a second amount in response to a second load condition, wherein the percent change from the first amount to the second amount is a greater percent change than the percent change from the first load condition to the second load condition.

8. The controller of claim 7, wherein the adjustable voltage reference circuit further includes an averaging circuit that changes a value of the voltage reference in response to a threshold adjust signal generated by one or more of the threshold adjust circuits.

9. An integrated circuit for a power converter, the integrated circuit comprising:
a power switch coupled to switch between an ON state and an OFF state;
a controller coupled to switch the power switch between the ON state and the OFF state with a switching signal to regulate an output of the power converter, wherein the controller is adapted to disable the power switch in response to a switch current flowing through the power switch reaching a switch current threshold; and
a feedback terminal coupled to the controller to receive a bias winding voltage representative of an output voltage of the power converter, wherein the controller is coupled to adjust the bias winding voltage nonlinearly in response to a load condition at the output of the power converter, wherein the controller detects the load condition in response to the switching signal.

10. The integrated circuit of claim 9, wherein the bias winding voltage is an average voltage over a time period substantially greater than a switching period of the power switch.

11. The integrated circuit of claim 9, wherein the controller is coupled to adjust an adjustable reference voltage of a feedback circuit included in the integrated circuit to adjust the bias winding voltage.

12. The integrated circuit of claim 9, wherein the controller is coupled to adjust a switch current limit to adjust the bias winding voltage.

13. The integrated circuit of claim 9, wherein the controller is a primary side controller.

14. The integrated circuit of claim 11, wherein the controller is coupled to adjust the adjustable reference voltage nonlinearly.

15. The integrated circuit of claim 14, wherein the controller is coupled to adjust the bias winding voltage during a range of load conditions.

16. The integrated circuit of claim 12, wherein the controller is coupled to adjust the current limit nonlinearly.

17. A power converter, comprising:
a power switch;
a controller coupled to the power switch to switch the power switch between an ON state and an OFF state with a switching signal to regulate an output of the power converter;
an energy transfer element coupled to the power switch to galvanically isolate an input from the output of the power converter and to transfer energy between the input and output of the power converter;
a bias winding coupled to the energy transfer element, wherein a bias winding voltage across the bias winding is representative of an output voltage at the output of the power converter and wherein the controller adjusts the bias winding voltage nonlinearly in response to a load condition at the output of the power supply, wherein the controller detects the load condition in response to the switching signal.

18. The power converter of claim 17, wherein the bias winding voltage is an average voltage across the bias voltage winding over a time period substantially greater than a switching period of the power switch.

19. The power converter of claim 18, wherein the bias winding voltage is adjusted by adjusting an adjustable reference voltage.

20. The power converter of claim 18, wherein the bias winding voltage is adjusted by adjusting a switch current limit.

21. The power converter of claim 17, wherein the controller is included in an integrated circuit.

22. The power converter of claim 17, wherein the power switch and the controller are integrated into a single monolithic integrated device.

23. The power converter of claim 17, wherein the controller determines the load condition in response to an effective switching frequency of the power switch.

24. The power converter of claim 17, wherein the controller adjusts the feedback voltage reference in response to detecting a number of disabled periods of the power switch.

25. A method for adjusting a bias winding voltage of a power supply, the method comprising:
regulating an output voltage of a power converter by switching a power switch between an ON state and an OFF state with a switching signal, wherein the power switch is adapted to revert to the OFF state when a switch current through the power switch exceeds a switch current threshold;
determining a load condition of a load to be coupled to an output of the power converter in response to the switching signal; and
adjusting a bias winding voltage nonlinearly in response to the load condition.

26. The method for adjusting a bias winding voltage of claim 25, wherein adjusting the bias winding voltage nonlinearly in response to the load condition comprises nonlinearly adjusting an adjustable reference voltage, the method further comprising inhibiting the switching of the power switch if the bias winding voltage is greater than the adjustable reference voltage.

27. The method for adjusting a bias winding voltage of claim 25, further comprising adjusting a current limit reference in the controller to adjust the bias winding voltage.

28. The method for adjusting a bias winding voltage of claim 25, further comprising limiting a switch current through the power switch to adjust the bias winding voltage.

29. A controller for a primary side control power converter, the controller comprising:
a driver circuit coupled to output a switching signal to switch a power switch between an ON state and an OFF state to regulate an output of the power converter;
a feedback circuit coupled to the driver circuit wherein the feedback circuit is coupled to output an enable signal to switch the power switch to the ON state in response to an output voltage signal;
a current limit circuit coupled to receive a current sense signal and switch the power switch to the OFF state when the switch current reaches a switch current threshold; and
an adjustable voltage reference circuit coupled to adjust a current limit such that a bias winding voltage of the power converter is adjusted nonlinearly in response to a load condition at the output of the power converter, wherein the adjustable voltage reference circuit is further coupled to detect the load condition in response to the switching signal.

30. The controller of claim 29, wherein the bias winding voltage is an average voltage over a time period substantially greater than a switching period of the switching signal.

31. An integrated circuit controller for a power converter, the controller comprising:
a driver circuit coupled to output a switching signal to control switching of a power switch to regulate an output of the power converter;
a feedback circuit coupled to the driver circuit to inhibit switching of the power switch if a bias winding voltage is greater than an adjustable reference voltage; and
an adjustable voltage reference circuit coupled to adjust the adjustable reference voltage nonlinearly in response to a load condition at the output of the power converter, wherein the adjustable voltage reference circuit is further coupled to detect the load condition in response to the switching signal.

32. The controller of claim 31, wherein the adjustable voltage reference circuit comprises:
a first threshold adjust circuit coupled to output a first threshold adjust signal responsive to a first load condition at the output of the power converter;
a second threshold adjust circuit coupled to output a second threshold adjust signal responsive to a second load condition at the output of the power converter; and
an averaging circuit coupled to generate the adjustable voltage reference and to adjust the adjustable voltage reference responsive to the first and second threshold adjust signals.

33. The controller of claim 32, wherein the averaging circuit comprises a capacitor coupled to store the adjustable voltage reference, wherein the capacitor is further coupled to be selectively discharged responsive to the first and second threshold adjust signals.

34. The controller of claim 33, wherein the averaging circuit further comprises first and second current sources, wherein the first current source is coupled to selectively decrease the average voltage across the capacitor at a first rate responsive to the first threshold adjust signal and wherein the second current source is coupled to decrease the average voltage across the capacitor at a second rate responsive to the second threshold adjust signal.

35. The controller of claim 32, wherein the first threshold adjust circuit is coupled to output the first threshold adjust signal responsive to a first number of consecutively disabled switching periods of the switching signal, and wherein the second threshold adjust circuit is coupled to output the second threshold adjust signal responsive to a second number of consecutively disabled switching periods of the switching signal.

36. The controller of claim 31, wherein the power switch is integrated into the integrated circuit controller.

* * * * *